United States Patent
George et al.

(10) Patent No.: US 9,504,003 B2
(45) Date of Patent: Nov. 22, 2016

(54) ARRIVAL-DELTA POSITION DETERMINATION

(71) Applicant: Broadcom Corporation, Irvine, CA (US)

(72) Inventors: Manoj Mathew George, Bangalore (IN); Yasantha Rajakarunanayake, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 87 days.

(21) Appl. No.: 14/518,245

(22) Filed: Oct. 20, 2014

(65) Prior Publication Data

US 2015/0373664 A1    Dec. 24, 2015

Related U.S. Application Data (60) Provisional application No. 62/013,858, filed on Jun. 18, 2014.

(51) Int. Cl.
 *H04W 24/00* (2009.01)
 *H04W 64/00* (2009.01)

(52) U.S. Cl.
 CPC .................................. *H04W 64/00* (2013.01)

(58) Field of Classification Search
 CPC ...................................................... H04W 64/00
 USPC ...................................................... 455/456.5
 See application file for complete search history.

(56) References Cited

U.S. PATENT DOCUMENTS

| | | | | |
|---|---|---|---|---|
| 8,666,428 | B2 * | 3/2014 | Ma | G01S 13/878 455/456.1 |
| 2002/0059535 | A1 * | 5/2002 | Bekritsky | G01S 1/026 713/400 |
| 2012/0218101 | A1 * | 8/2012 | Ford | G08B 5/22 340/539.12 |
| 2013/0346054 | A1 * | 12/2013 | Mumtaz | H02J 3/383 703/13 |
| 2015/0319725 | A1 * | 11/2015 | Marshall | H04W 56/0015 370/350 |

* cited by examiner

*Primary Examiner* — Nader Bolourchi
(74) *Attorney, Agent, or Firm* — Sterne, Kessler, Goldstein & Fox P.L.L.C.

(57) ABSTRACT

Embodiments provide an indoor position system that can be used by an mobile device (legacy or non-legacy) without changes at the mobile device. In an embodiment, to use the indoor position system, a user of the mobile device downloads an application to the mobile device, which interfaces with the mobile device's existing wireless radio technology circuitry or module (e.g., WLAN chip) to obtain the position of the mobile device. In one embodiment, the indoor position system includes a plurality of wireless anchors with known positions that are each configured to receive a packet transmitted by the mobile device, time-stamp the packet per the arrival time of the packet, and forward the time-stamped packet to a pre-defined site. At the pre-defined site, the position of the mobile device is computed and sent to the application running on the mobile device.

20 Claims, 7 Drawing Sheets

ARRIVAL-DELTA POSITION DETERMINATION

CROSS-REFERENCE TO RELATED APPLICATION(S)

The present application claims the benefit of U.S. Provisional Application No. 62/013,858, filed Jun. 18, 2014, which is incorporated herein by reference in its entirety.

BACKGROUND

1. Technical Field

The present disclosure relates generally to indoor positioning.

2. Background Art

Existing indoor position solutions rely on Wireless Local Area Network (WLAN) Access Points (APs) that are aware of their respective positions transmitting packets to a mobile device. The mobile device uses the packets to estimate its distance to each of the WLAN APs and computes its position by triangulation. Because these solutions rely on computation at the mobile device, they typically cannot be performed in legacy mobile devices without substantial hardware and/or software changes.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

For the purposes of this discussion, the term "processor circuitry" shall be understood to include one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal or external memory to retrieve instructions stored in the memory, which when executed by the processor, perform the corresponding function(s) associated with the processor.

Existing indoor position solutions generally rely on Wireless Local Area Network (WLAN) Access Points (APs) that are aware of their respective positions transmitting packets to a mobile device. The mobile device uses the packets to estimate its distance to each of the WLAN APs and computes its position by triangulation. Because these solutions rely on computation at the mobile device, they typically cannot be performed in legacy mobile devices without substantial hardware and/or software changes at the mobile device.

Embodiments, as further described below, provide an indoor position system that can be used by a mobile device (legacy or non-legacy) without changes at the mobile device. In an embodiment, to use the indoor position system, a user of the mobile device downloads an application to the mobile device, which interfaces with the mobile device's existing wireless radio technology circuitry or module (e.g., WLAN chip) to obtain the position of the mobile device. In one embodiment, the indoor position system includes a plurality of wireless anchors with known positions that are each configured to receive a packet transmitted by the mobile device, time-stamp the packet per the arrival time of the packet, and forward the time-stamped packet to a pre-defined site. At the pre-defined site, the position of the mobile device is computed and sent to the application running on the mobile device.

Figure 1:
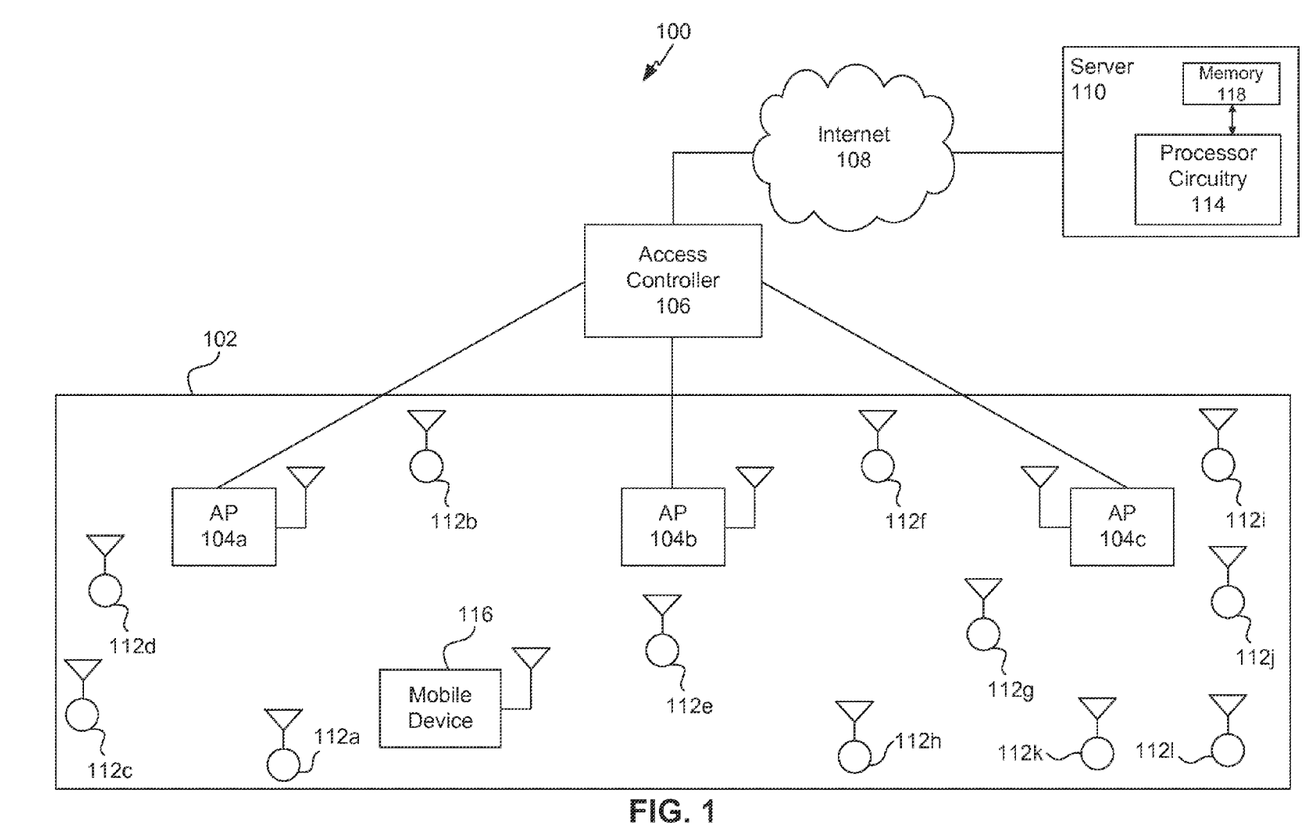
FIG. 1 illustrates an example environment in which embodiments can be implemented or practiced.

FIG. 1 illustrates an example environment 100 in which embodiments can be implemented or practiced. Example environment 100 is provided for the purpose of illustration only and is not limiting of embodiments. As shown in FIG. 1, example environment 100 includes a plurality of APs 104a, 104b, and 104c, a plurality of wireless anchors 112a-1, an Access Controller 106, a server 110, and a mobile device 116.

In an embodiment, APs 104a-c, wireless anchors 112a-1, and mobile device 116 are located in an area 102. Area 102 can be indoor, semi-indoor, or outdoor. In an embodiment, wireless anchors 112a-1 are distributed more densely than APs 104a-c through area 102. For example, in an embodiment, the ratio of wireless anchors to APs is at least 4:1. In another embodiment, wireless anchors 112a-1 are distributed within area 102 such that at least 4 wireless anchors are within the communication range of each of APs 104a-c.

APs 104a-c are connected to Access Controller 106, which may or may not be within area 102. Access Controller 106 connects APs 104a-c to the Internet 108. In turn, APs 104a-c can provide Internet access to devices in their vicinity, such as mobile device 116 or wireless anchors 112a-1. For example, mobile device 116 or wireless anchors 112a-1 can use one of APs 104a-c to reach server 110 via the Internet 108. Server 110 can include a processor circuitry 114, which can be implemented as described above. In an embodiment, processor circuitry 114 executes instructions stored in a memory 118 to perform the server functionalities described herein.

According to embodiments, APs 104a-c can be Wireless Local Area Network (WLAN) APs, Bluetooth APs, or APs of other similar wireless radio technologies. Wireless anchors 112a-1 can be "thin" APs (APs with reduced functionality). In an embodiment, wireless anchors 112a-1 include hardware for wireless transmitting and receiving packets of the supported radio protocol (e.g., WLAN, Bluetooth, etc.), but, as shown in FIG. 1, are not connected to Access Controller 106 to provide access to the Internet 108.

Figure 2:
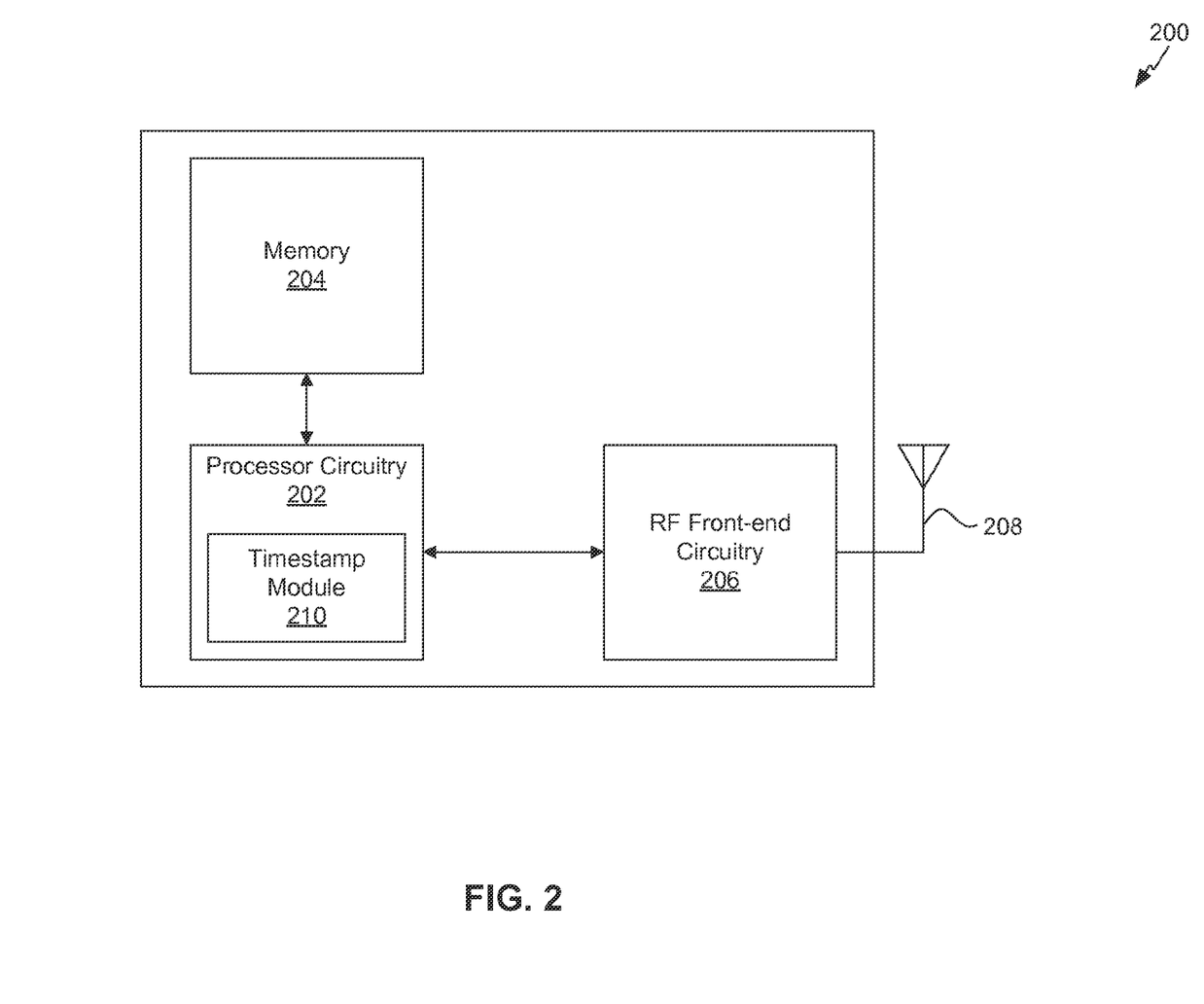
FIG. 2 illustrates an example wireless anchor according to an embodiment.

FIG. 2 illustrates an example wireless anchor 200 according to an embodiment. Example wireless anchor 200 is provided for the purpose of illustration only and is not limiting of embodiments. As shown in FIG. 2, example anchor 200 includes processor circuitry 202, a memory 204, radio frequency (RF) front-end circuitry 206, and an antenna 208. In an embodiment, processor circuitry 202 includes, implements, or executes a timestamp module 210, which is further described below.

Processor circuitry 202 can be implemented as described above to perform the wireless anchor functionalities described herein. Memory 204 can store instructions for execution by processor circuitry 202 to perform the wireless anchor functionalities described herein. Antenna 208 enables reception and transmission of wireless signals that represent packets of the wireless protocol supported by wireless anchor 200. As described above, the wireless protocol can be WLAN, Bluetooth, or other similar wireless radio technology. RF front-end circuitry 206 interfaces with processor circuitry 202 to provide or receive baseband signals to/from processor circuitry 202. Specifically, in the receive mode, a radio receiver of RF front-end circuitry receives RF signals from antenna 208, frequency down-converts the RF signals to generate incoming baseband signals, and provides the incoming baseband signals to processor circuitry 202. In the transmit mode, a radio transmitter of RF front-end circuitry receives outgoing baseband signals from processor circuitry 202, frequency up-converts the outgoing baseband signals to generate RF signals, and provides the RF signals to antenna 208 for transmission.

Returning to FIG. 1, in an embodiment, APs 104a-c, wireless anchors 112a-1, server 110, and/or mobile device 116 form a positioning system that can be used to determine the position of a device. For the purpose of illustration only, example operation of the positioning system is described herein with respect to determining the position of mobile device 116. However, as would be understood by a person of skill in the art, the positioning system can be used to determine the position of any device located within example environment 100, including, for example, the position of an AP 104a-c, a wireless anchor 112a-1, or any other fixed or mobile device within example environment 100.

In an embodiment, position determination of mobile device 116 begins with mobile device 116 transmitting a packet. In one embodiment, a user of mobile device 116 downloads an application onto mobile device 116. When the application is executed, the application causes a packet to be transmitted, e.g., periodically and/or as defined by the user. In an embodiment, the application interfaces with the existing wireless radio technology circuitry of mobile device 116 to transmit the packet. The packet can be of any wireless protocol according to embodiments, including WLAN, Bluetooth, etc.

In an embodiment, upon launch, the application first establishes a session with a pre-defined site where position determination is performed. In one embodiment, the pre-defined site is identified by a pre-determined IP (Internet Protocol) address. Establishing the session can include sending a message identifying mobile device 116, e.g., by IP and MAC (Medium Access Control) address, to the pre-defined site so that the pre-defined site can subsequently forward computed positions to mobile device 116.

In another embodiment, the packet is not caused by the application and is instead part of a communication session of mobile device 116. For example, the packet may be addressed to one of APs 104a, 104b, and 104c with which mobile device 116 is in communication to support a user activity on mobile device 116.

Devices within example environment 100 may be able to receive the packet transmitted by mobile device 116. For example, APs 104a and 104b and wireless anchors 112a, 112b, 112c, 112d, and 112e may receive the packet transmitted by mobile device 116. In another embodiment, the packet may be received by other mobile devices within example environment 100.

In one embodiment, position determination of mobile device 116 depends on the packet transmitted by mobile device 116 being received by wireless anchors within example environment 100. In an embodiment, at least 4 wireless anchors must receive the packet in order to determine the position of mobile device 116. In another embodiment, the reception of the packet by any device with known position within example environment 100, including for example APs 104a-c and/or mobile devices with known positions, can also be used in the position determination of mobile device 116. For the purpose of facilitating the presentation, position determination of mobile device 116 will be described herein as being performed based on the reception of the packet transmitted by mobile device 116 by wireless anchors. A person of skill in the art would understand based on the teachings herein how the reception of the packet by other devices can also be used to determine the position of mobile device 116.

Figure 3:
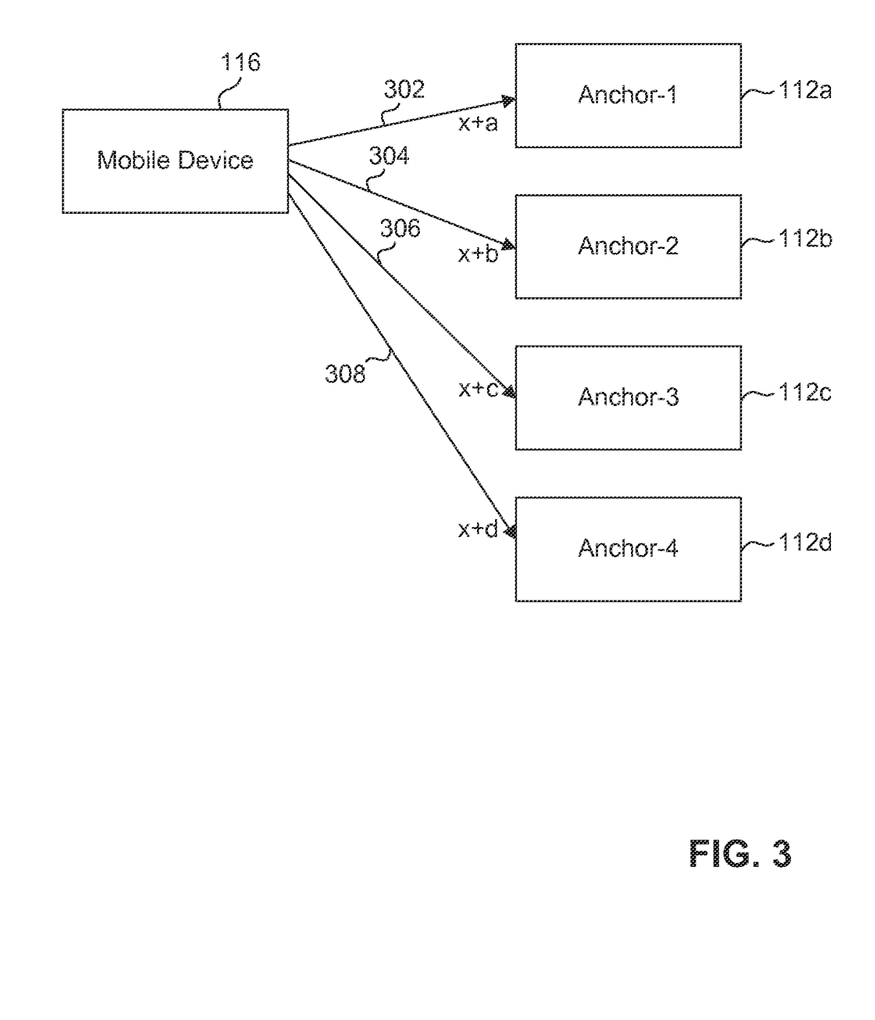
FIG. 3 illustrates a step of an example process according to an embodiment.

In one embodiment, the position of mobile device 116 is determined based on differences between arrival times of the packet transmitted by mobile device 116 at wireless anchors, such as wireless anchors 112a-1. This embodiment is illustrated in FIG. 3, which shows mobile device 116 transmitting the packet and wireless anchors 112a, 112b, 112c, and 112d receiving the packet. Because wireless anchors 112a, 112b, 112c, and 112d are located at different respective distances 302, 304, 306, and 308 from mobile device 116, the packet is received at different times at wireless anchors 112a, 112b, 112c, and 112d. For example, as shown in FIG. 3, the arrival times at wireless anchors 112a, 112b, 112c, and 112d can be represented as (x+a), (x+b), (x+c), and (x+d), respectively.

In an embodiment, knowledge of three or more differences between the arrival times (x+a), (x+b), (x+c), and (x+d) is sufficient to determine the position of mobile device 116, given knowledge of the positions of wireless anchors 112a, 112b, 112c, and 112d. For example, in an embodiment, knowledge of the quantities (b-a), (c-a), and (d-a) can be sufficient to determine the position of mobile device 116.

In an embodiment, the position of mobile device 116 can be determined by performing a multi-lateration calculation using the three differences (b-a), (c-a), and (d-a). An example multi-lateration calculation according to an embodiment is described below. This example calculation is provided for the purpose of illustration only and is not limiting of embodiments. For the purpose of illustration, assume that the position of mobile device 116 is denoted by the coordinates (x, y, z) which are to be determined. The positions of wireless anchors 112a, 112b, 112c, and 112d, which are known, are denoted respectively by $(x_a, y_a, z_a)$, $(x_b, y_b, z_b)$, $(x_c, y_c, z_c)$, and $(x_d, y_d, z_d)$. For simplification, it is also assumed that mobile device 116 transmits the packet at time t=0.

Based on the above, the arrival times of the packet at wireless anchors 112a, 112b, 112c, and 112d can be written as:

$$T_a = (1/c)\sqrt{((x-x_a)^2 + (y-y_a)^2 + (z-z_a)^2)};$$

$$T_b = (1/c)\sqrt{((x-x_b)^2 + (y-y_b)^2 + (z-z_b)^2)};$$

$$T_c = (1/c)\sqrt{((x-x_c)^2 + (y-y_c)^2 + (z-z_c)^2); \text{ and}}$$

$$T_d = (1/c)\sqrt{((x-x_d)^2 + (y-y_d)^2 + (z-z_d)^2)},$$

where c represents the propagation speed of the packet (e.g., speed of light).

Assuming that the position of wireless anchor 112a represents the origin of the coordinate system (i.e., $x_a=0$, $y_a=0$, and $z_a=0$), then the arrival time at wireless anchor 112a reduces to $T_a=(1/c)\sqrt{(x^2+y^2+z^2)}$.

Subsequently, the differences (b–a), (c–a), and (d–a) between the arrival times of the packet at wireless anchors 112b, 112c, and 112d and the arrival time of the packet at wireless anchor 112a can be written as:

$$(b-a) T_b - T_a = (1/c)[\sqrt{((x-x_b)^2 + (y-y_b)^2 + (z-z_b)^2)} - \sqrt{(x^2+y^2+z^2)}];$$

$$(c-a) = T_c - T_a = (1/c)[\sqrt{((x-x_c)^2 + (y-y_c)^2 + (z-z_c)^2)} - \sqrt{(x^2+y^2+z^2)}]; \text{ and}$$

$$(d-a) = T_d - T_a = (1/c)[\sqrt{((x-x_d)^2 + (y-y_d)^2 + (z-z_d)^2)} - \sqrt{(x^2+y^2+z^2)}].$$

In an embodiment, the differences (b-a), (c-a), and (d-a) are known by virtue of the wireless anchors relaying their respective arrival times of the packet to a pre-defined site. As such, the difference equations provide three equations with three unknowns (x, y, z), which can be solved to determine the position of mobile device 116 relative to the origin given by wireless anchor 112a. The absolute position of mobile device 116 can then be derived from the known position of wireless anchor 112a.

In an embodiment, if a wireless anchor of wireless anchors 112a, 112b, 112c, and 112d is suffering from multipath effects, the arrival time reported by the wireless anchor may not accurately correspond to the true propagation time of the packet from mobile device 116 to the wireless anchor. This may result in no solution to the above described difference equations. In an embodiment, wireless anchors are distributed densely such that multiple wireless anchor combinations (e.g., of size 4) can be formed. The position of the mobile device can be computed based on different wireless anchor combinations. A wireless anchor that is suffering from multi-path will cause the wireless anchor combination to result in no solution and can be thus be identified and avoided.

In an embodiment, to enable the above described position determination, upon receiving the packet transmitted by mobile device 116, a wireless anchor, e.g., wireless anchor 112a, determines the arrival time of the packet and relays the determined arrival time to a pre-defined site where the position of mobile device 116 is determined. The pre-defined site can be server 110, an AP such as APs 104a-c, and/or a mobile device, such as mobile device 116. For the purpose of facilitating the presentation, the pre-defined site will be described below as being server 110. However, as will be apparent to a person of skill in the art based on the teachings herein, embodiments are not limited to this example. For example, any of the functionalities described herein of server 110 can be performed elsewhere within example environment 100, such as at one or more of APs 104a-c, one or more of wireless anchors 112a-1, and/or mobile device 116.

In one embodiment, as shown in FIG. 2, wireless anchor 112a implements a timestamp module 210 that can be used to time-stamp the received packet to generate a time-stamped packet. In an embodiment, timestamp module 210 inserts into the packet the local clock time of wireless anchor 112a corresponding to the arrival time of the packet at wireless anchor 112a. In one embodiment, wireless anchor 112a implements a free running counter to represent the local clock time, and timestamp module 210 inserts the value of the counter corresponding to the arrival time into the packet to generate the time-stamped packet. After time-stamping the packet, wireless anchor 112a sends the time-stamped packet to the pre-defined site, e.g., server 110. In an embodiment, wireless anchor 112a forwards the time-stamped packet to server 110 via one of APs 104a, 104b, and 104c. In another embodiment, only the timestamp and identifying information of the packet (e.g., source address, destination address, sequence number) is forwarded to save bandwidth.

In an embodiment, server 110 is configured to receive the time-stamped packet from wireless anchor 112a, where the time-stamped packet includes the arrival time at wireless anchor 112a (hereinafter "first arrival time") of the packet transmitted by mobile device 116. When a time-stamped packet from a second wireless anchor, e.g., 112b, has also been received, server 110 is configured to determine a first difference between the first arrival time of the packet and a second arrival time of the packet at the second wireless anchor. In an embodiment, server 110 repeats this process to further determine a second difference between the first arrival time of the packet and a third arrival time of the packet at a third wireless anchor, e.g., wireless anchor 112c, and a third difference between the first arrival time of the packet and a fourth arrival time of the packet at a fourth wireless anchor, e.g., 112d.

In an embodiment, once the first, second, and third differences have been determined, server 110 computes the position of the mobile device based at least in part on the first, second, and third differences. In an embodiment, server 110 determines first, second, third, and fourth positions of wireless anchors 112a, 112b, 112c, and 112d respectively, and performs a multi-lateration calculation, as described above, using the first, second, third, and fourth positions and the first, second, and third differences to compute the position of mobile device 116. In one embodiment, the positions of wireless anchors 112a, 112b, 112c, and 112d are stored in memory 118 of server 110. In another embodiment, the positions are obtained by server 110 from an external database. In a further embodiment, each wireless anchor is aware of its own position and relays its position to server 110 in the time-stamped packet. In an embodiment, at initial configuration of the wireless anchors, the positions of four or more wireless anchor are determined either manually or using GPS. The position of every other wireless anchor can then be determined as long as it is within range of at least 4 others with known positions by transmitting a packet and using the process described herein.

After determining the position, server 110 can forward the position to mobile device 116, e.g., via one of APs 104a, 104b, and 104c. In an embodiment, server 110 forwards the position to the application running on mobile device 116, which displays the position on a map.

As described above, the multi-lateration calculation of the position of mobile device 116 relies on knowledge of the differences between the arrival times of the packet at the wireless anchors. But for this calculation to be accurate, the arrival times used to compute the differences must all be relative to the same time reference. In one embodiment, the wireless anchors are time synchronized with each other (e.g., have the same local clock time at any moment) such that the times of arrival reported to server 110 are already relative to the same time reference. In another embodiment, the wireless anchors are not time synchronized and each may have a different local clock time at any moment from the others. In such an embodiment, to use the times of arrival reported by the wireless anchors, server 110 establishes a common time reference between the wireless anchors and then determine the differences between the arrival times using the common time reference.

Figure 4:
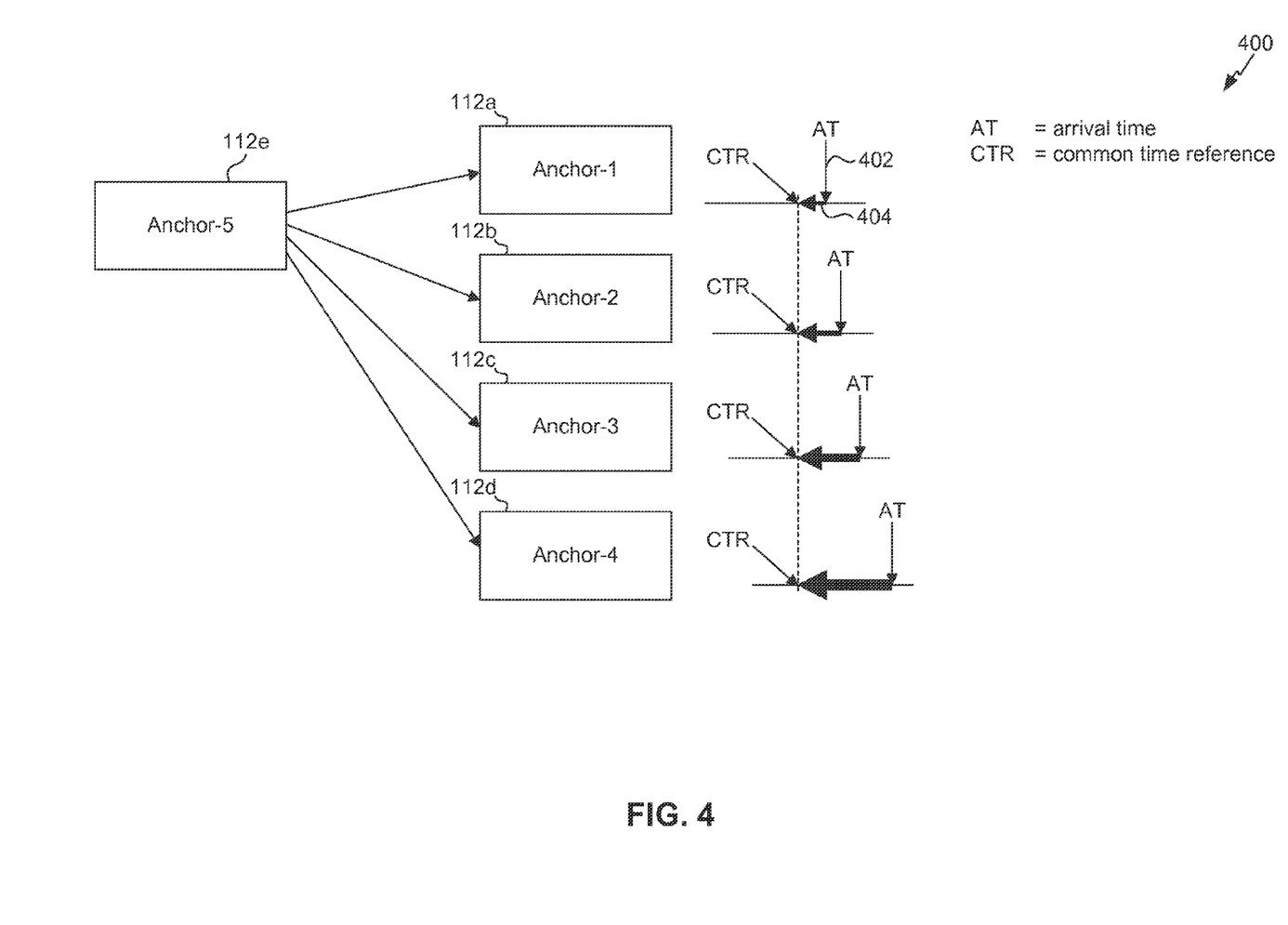
FIG. 4 is an example that illustrates establishing a common time reference between wireless anchors according to an embodiment.

FIG. 4 is an example 400 that illustrates establishing a common time reference between wireless anchors 112a, 112b, 112c, and 112d according to an embodiment. Example 400 is provided for the purpose of illustration only and is not limiting of embodiments. In embodiments, a common time reference between any number of wireless anchors greater than or equal to two can be established as shown in example 400. In an embodiment, a common time reference is established (and maintained as further described below) between wireless anchors that are in proximity to each other and therefore likely to respond to the same packet transmitted by a mobile device. For example, referring to FIG. 1, in an embodiment, a common time reference can be established between wireless anchors 112a, 112b, 112c, 112d, and 112e. Similarly, a common time reference can be established between wireless anchors 112e, 112f, 112g, and 112h, for example, and so on.

In an embodiment, as shown in FIG. 4, the process of establishing a common time reference between a set of wireless anchors, e.g., wireless anchors 112a, 112b, 112c, and 112d, begins by transmitting a packet from a known location. The packet can be transmitted for example from a wireless anchor, e.g., 112e, whose location is known. Alternatively, the packet can be transmitted from one of APs 104a-c or from any other device whose position is known. For example, the packet can be transmitted from a mobile device with known location, e.g., with GPS visibility.

Wireless anchors receiving the transmitted packet, e.g., wireless anchors 112a, 112b, 112c, and 112d, respond by time-stamping the received packet with their respective times of arrival of the packet and forwarding the time-stamped packets to server 110. Server 110 receives the time-stamped packets from the wireless anchors and uses the respective times of arrival conveyed in the time-stamped packets to establish the common time reference between the wireless anchors.

In an embodiment, the common time reference corresponds to the absolute transmission time of the packet from the known location. Server 110 thus determines for each wireless anchor a local clock time value that corresponds to the absolute transmission time of the packet. In an embodiment, server 110 determines the local clock time value for a wireless anchor by subtracting a propagation time of the packet (transmitted from the known location to the wireless anchor) from the time of arrival of the packet indicated in the time-stamped packet received from the wireless anchor. Because the packet is transmitted from a known location and the position of the wireless anchor is also known to server 110, server 110 can calculate the propagation time of the packet.

For example, as shown in FIG. 4, server 110 computes a first local clock time value for wireless anchor 112a by subtracting a propagation time 404 from an arrival time 402 reported by wireless anchor 112a. As described above, arrival time 402 is reported by wireless anchor 112a based on its local clock time, e.g., arrival time 402 may correspond to the value of a free-running counter within wireless anchor 112a. Thus, the first local clock time value corresponds to the local clock time of wireless anchor 112a at the time that the packet was transmitted. In a similar manner, server 110 can compute a second local clock time value for wireless anchor 112b, a third local clock time value for wireless anchor 112c, and a fourth local clock time value for wireless anchor 112d, each of which corresponds to the local clock time of the wireless anchor at the time that the packet was transmitted from the known location.

To establish the common time reference between wireless anchors 112a, 112b, 112c, and 112d, server 110 associates the determined local clock time values with each other. For example, a result of this association may be that local clock time "1704" at wireless anchor 112a corresponds to the same absolute time as local clock time "1806" at wireless anchor 112b, local clock time "1208" at wireless anchor 112c, and local clock time "2003" at wireless anchor 112d. In an embodiment, to increase the accuracy of the common time reference, the process described above is repeated for multiple packets transmitted from the known location and the results are averaged.

Once the common time reference is established, server 110 can use the common time reference to determine differences between times of arrivals reported by wireless anchors 112a, 112b, 112c, and 112d. For example, assume that the example common time reference described above has been established and that, in response to a packet from mobile device 116, wireless anchors 112a and 112b report times of arrival of "1804" and "1907" respectively. Server 110 can determine that the local clock time has advanced by 100 and 101 time units respectively at wireless anchors 112a and 112b. Assuming that drift is accounted for (as further described below), then server 110 can determine that wireless anchor 112b received the packet one time unit (e.g., 1 nanosecond) after wireless anchor 112a, which corresponds to the difference of arrival times between wireless anchors 112a and 112b.

In an embodiment, the process of establishing a common time reference between the wireless anchors is repeated at a periodic cycle to ensure an accurate common time reference is used. In practice, however, wireless anchors can have different local clock accuracy, which can result in drift between the local clock times of the wireless anchors (e.g., one wireless anchor may be counting at a faster rate than another wireless anchor) between calculation cycles of the common time reference. In an embodiment, drift between wireless anchors can be estimated so that it can accounted for at any time between calculation cycles of the common time reference.

Figure 5:
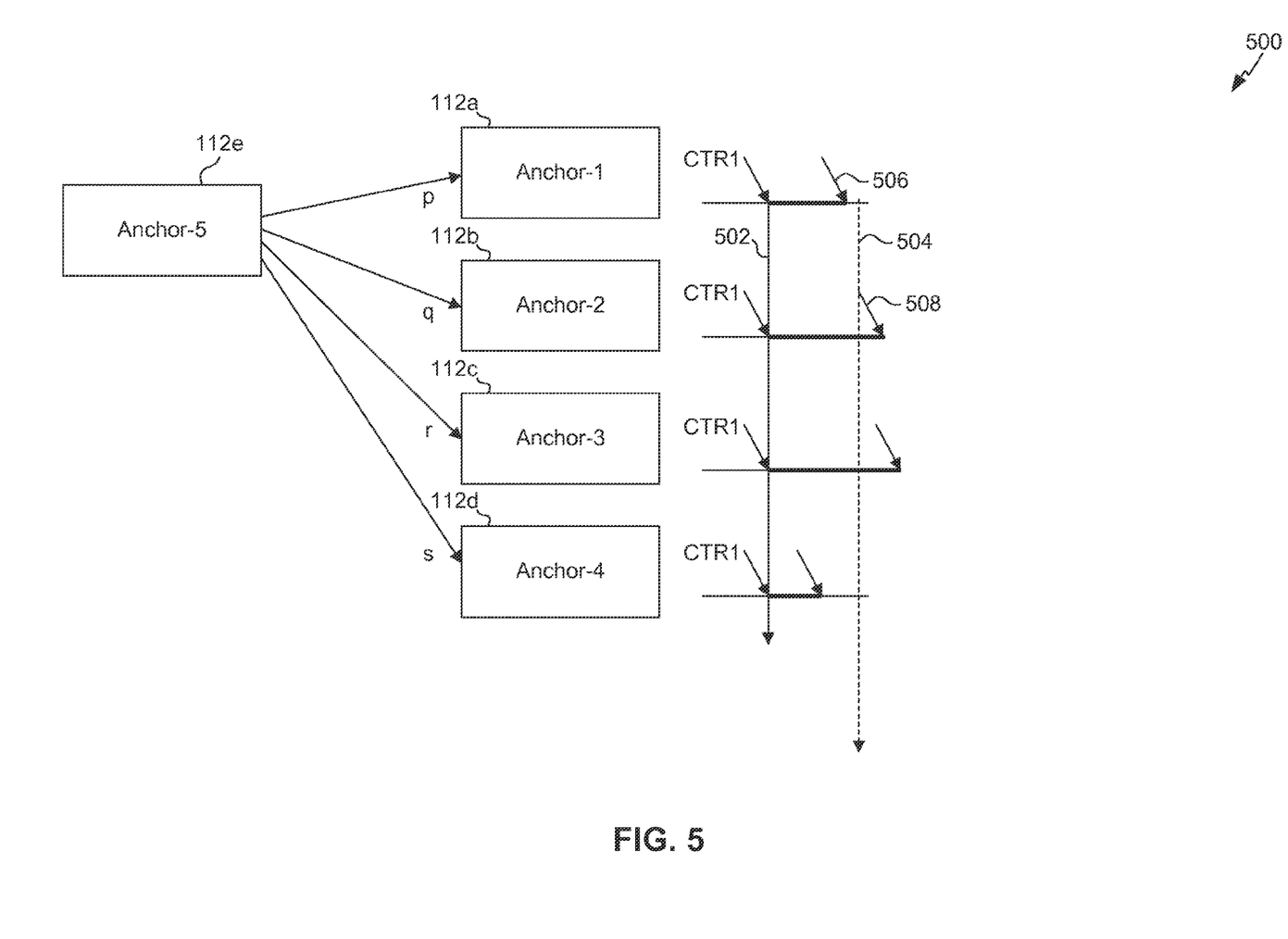
FIG. 5 is an example that illustrates estimating time drift between wireless anchors according to an embodiment.

FIG. 5 is an example 500 that illustrates estimating time drift between wireless anchors according to an embodiment. Example 500 is provided for the purpose of illustration only and is not limiting of embodiments.

As shown in FIG. 5, a first common time reference (CTR1) is initially established with reference to an absolute time 502 using the process described above. CTR1 associates local clock time values of the wireless anchors that correspond to absolute time 502 (e.g., absolute time 502 can be the transmission time of a packet from a known location) to each other. For example, assume that CTR1 associates the local clock time value "10" at wireless anchor 112a with the local clock time value "50" at wireless anchor 112b.

Subsequently, at a known time interval from absolute time 502, another packet is transmitted from the known location at absolute time 504. In an embodiment, the known time interval is selected such that any anticipated time drift can manifest itself within the known time interval. For example, assume that absolute time 504 is equal to absolute time 502 plus 100 time units. If there is no drift at either of wireless anchors 112a and 112b, then the local clock times of wireless anchors 112a and 112b would have both advanced by 100 units at absolute time 504 relative to absolute time 502. A second common time reference (CTR2) would thus associate the local clock time value "110" at wireless anchor 112a with the local clock time value "150" at wireless anchor 112b.

On the other hand, if there is measurable drift at either of wireless anchors 112a and 112b, then at absolute time 504 the local clock time value at wireless anchor 112a would not coincide with "110" and/or the local clock time value at wireless anchor 112b would not coincide with "150." For example, as shown in FIG. 5, wireless anchor 112a may be running a slow clock that counts less than 100 time units between absolute times 502 and 504. Calculation of the local clock time at wireless anchor 112a at absolute time 504, based on this slower clock, results in a local clock time value that corresponds to an absolute time 506 that is earlier than absolute time 504. Similarly, wireless anchor 112b may be running a fast clock that counts more than 100 time units between absolute times 502 and 504. Calculation of the local clock time at wireless anchor 112a at absolute time 504, based on this faster clock, results in a local clock time value that corresponds to an absolute time 508 that is after absolute time 504.

The difference between absolute times 506 and 504 represents the drift of wireless anchor 112a within the known time interval. The difference between absolute times 508 and 504 represents the drift of wireless anchor 112b within the known interval. The difference between absolute times 506 and 508 represents the relative drift between wireless anchors 112a and 112b during the known time interval. In an embodiment, the drift of a wireless anchor is measured multiple times and averaged over the multiple measurements to increase the estimated drift accuracy.

In between calculation cycles of the common time reference, the estimated drift of the wireless anchor can be used to update the common time reference. For example, assume that the respective drifts of wireless anchors 112a and 112b are +10 times units and −10 times units between calculation cycles of the common time reference, where the calculation cycle repeats every 100 time units. Further, assume that a common time reference established at time t=0 associates the local clock time value "10" at wireless anchor 112a with the local clock time value "50" at wireless anchor 112b. At any time between t=0 and t=100 (which coincides with the next common time reference calculation), the common time reference can be updated based on the estimated drifts by interpolation. For example, at t=50 time, the local clock time value at wireless anchor 112a can be estimated as "10+50+ 5=65" and the local clock time value at wireless anchor 112b can be estimated as "50+50−5=95." The common time reference at t=50 can thus be updated to associate the local clock time value "65" at wireless anchor 112a with the local clock time value "95" at wireless anchor 112b.

In an embodiment, because the common time reference with respect to each wireless anchor is updated based on a difference of arrival times of packets transmitted from the known location, differences in propagation times inside the wireless anchors have no effect on position determination accuracy. In other words, embodiments do not require the wireless anchors to be identical or to have identical delays from the time the packet is first received by the antenna to the time that the packet is time-stamped. As a result, embodiments allow wireless anchors of different generations to be used together.

Figure 7:
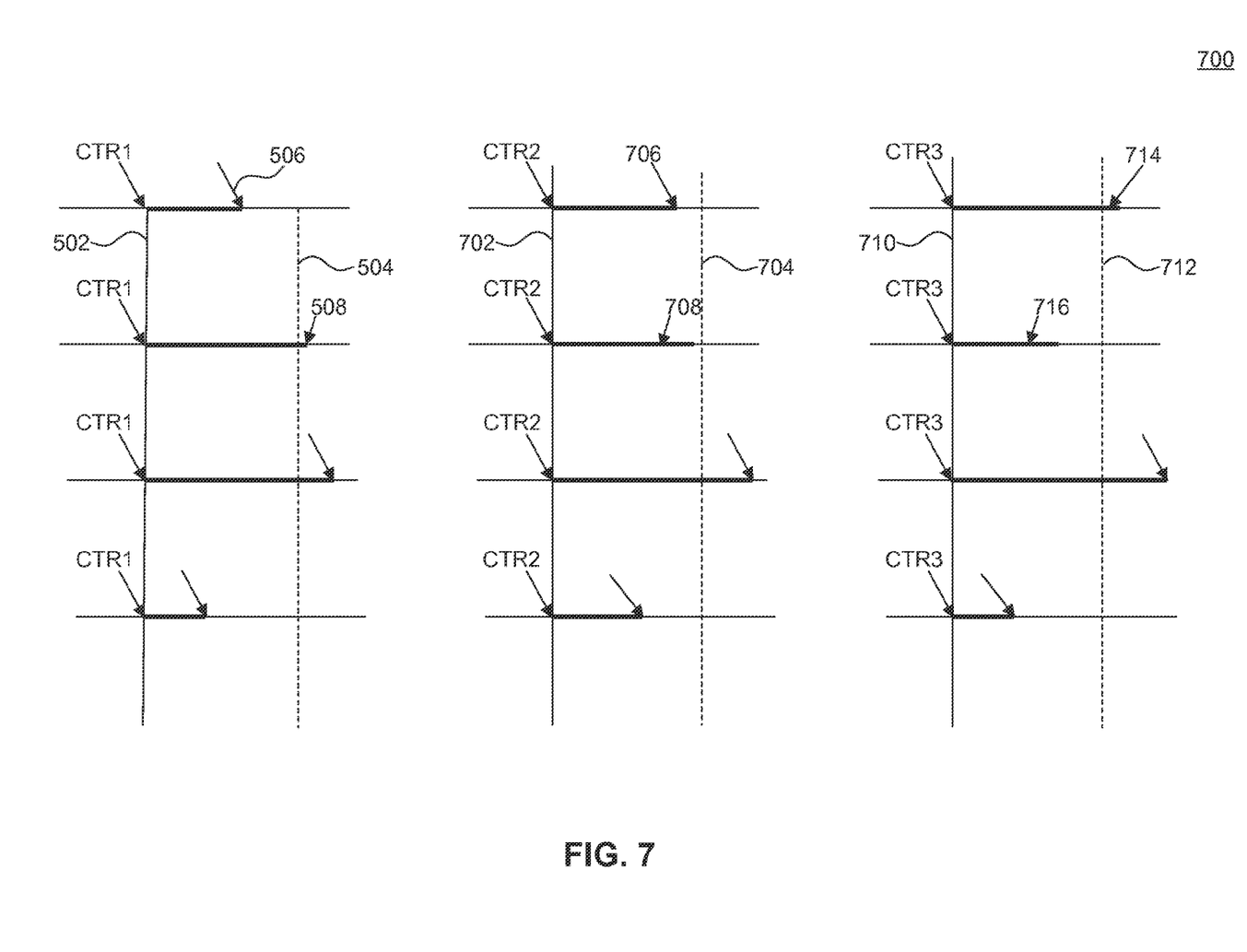
FIG. 7 is an example that illustrates drift rate variation in wireless anchors.

In another embodiment, the drift of a wireless anchor can be modeled as a polynomial for greater accuracy. This embodiment is suitable for cases where the drift rate of the wireless anchor can vary from one cycle to another, as illustrated in example 700 shown in FIG. 7. FIG. 7 illustrates example drifts of wireless anchors 112a-112d over three exemplary successive cycles. As shown, the drifts of anchors 112a-112d can vary from one cycle to another. These variations can be due to thermal changes, for example, which may cause the crystal oscillator of a wireless anchor to run faster or slower over a given period of time. For instance, example 700 illustrates the local clock of wireless anchor 112a running faster over the three successive cycles resulting in absolute times 506, 706, and 714 increasing (difference between absolute time 714 and CTR3 is greater than the difference between absolute time 706 and CTR2, which is greater than the difference between absolute time 506 and CTR1). In contrast, the local clock of wireless anchor 112b is illustrated as running slower, as shown by the decrease in absolute values 508, 708, and 716 (the difference between absolute time 716 and CTR3 is smaller than the difference between absolute time 708 and CTR2, which is smaller than the difference between absolute time 508 and CTR1).

Figure 6:
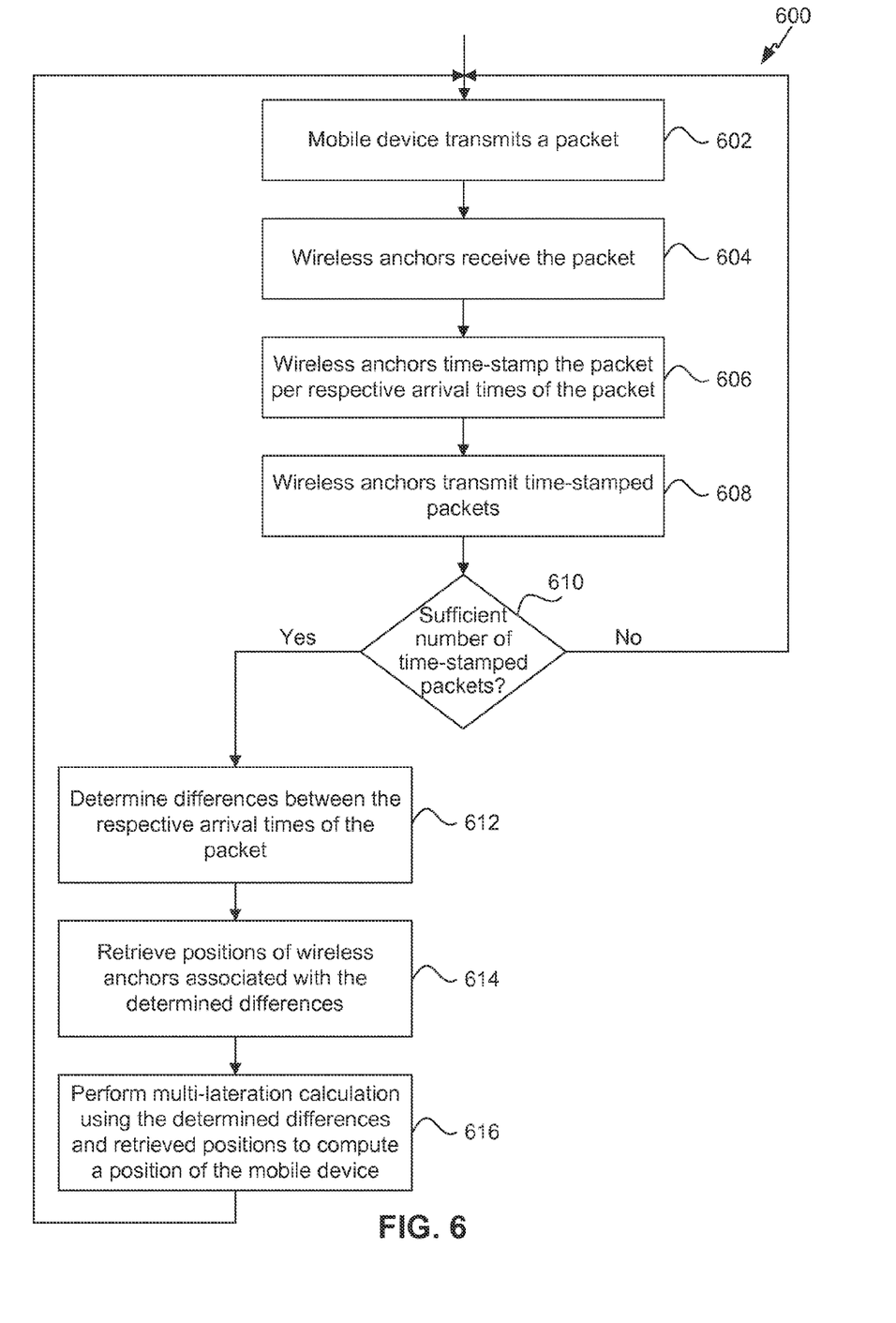
FIG. 6 illustrates an example process according to an embodiment.

In an embodiment, for each wireless anchor, drift measurements are made and a polynomial fit is performed using the drift measurements to determine a polynomial approximation for the drift over time. These computations can be performed at the wireless anchor or another entity. In an embodiment, the polynomial is a third order polynomial function of time that is computed based on the last three drift measurements. Other order polynomial may also be used as would be understood by a person of skill in the art based on the teachings herein. FIG. 6 illustrates an example process 600 according to an embodiment. Example process 600 is provided for the purpose of illustration only and is not limiting of embodiments. Example process 600 can be used to determine the position of a mobile device, such as mobile device 116, in an environment such as example environment 100. The environment includes a plurality of anchors.

As shown in FIG. 6, process 600 begins in step 602, which includes the mobile device transmitting a packet. The packet can be of any wireless protocol according to embodiments, including WLAN, Bluetooth, etc. Step 604 includes wireless anchors of the plurality of wireless anchors receiving the packet transmitted by the mobile device. Then, step 606 includes the wireless anchors that received the packet each time-stamping the packet per a respective arrival time of the packet. In an embodiment, to time-stamp the packet, the wireless anchor inserts into the packet a local clock time value corresponding to the time of arrival of the packet at the wireless anchor.

Subsequently, step 608 includes the wireless anchors that received and time-stamped the packet transmitting the time-stamped packets to a pre-defined site. As would be understood by a person of skill in the art, the wireless anchors may transmit the time-stamped packets at different times from each other in step 608. The pre-defined site can be a server, such as server 110, an AP such as APs 104a-c, and/or a mobile device, such as mobile device 116.

The pre-defined site may receive the time-stamped packets from a plurality of wireless anchors, and step 610 includes determining whether a sufficient number of time-stamped packets has been received. In an embodiment, step 610 includes determining whether at least four time-stamped packets from four different wireless anchors of the plurality of wireless anchors have been received. If the answer is no, process 600 returns to step 602. Otherwise, process 600 proceeds to step 612.

Step 612 includes determining differences between the respective arrival times of the packet indicated in the received time-stamped packets. In an embodiment, step 612 includes determining a first difference between a first arrival time of the packet at a first wireless anchor of the plurality of wireless anchors and a second arrival time of the packet at a second wireless anchor of the plurality of wireless anchors; determining a second difference between the first arrival time of the packet and a third arrival time of the packet at a third wireless anchor of the plurality of wireless anchors; and determining a third difference between the first arrival time of the packet and a fourth arrival time of the packet at a fourth wireless anchor of the plurality of wireless anchors.

In an embodiment, determining a difference between a first arrival time of the packet at a first wireless anchor and a second arrival time of the packet at a second wireless anchor includes establishing a common time reference between the first wireless anchor and the second wireless anchor, and determining the difference between the first arrival time of the packet and the second arrival time of the packet using the common time reference.

In an embodiment, the process of establishing a common time reference between the first wireless anchor and the second wireless anchor includes the first and second wireless anchors receiving and time-stamping a packet transmitted from a known location. At the pre-defined site, the process further includes receiving time-stamped packets from the first and second wireless anchors corresponding to the packet transmitted from the known location, and determining based on the arrival times indicated in the time-stamped packets a first time value associated with the first wireless anchor and a second time value associated with the second wireless anchor corresponding to the transmission time of the packet from the known location. In an embodiment, the first time value associated with the first wireless anchor is determined by calculating a propagation time of the packet from the known location to the first wireless anchor, and subtracting the propagation time from the arrival time of the packet indicated by the time-stamped packet from the first wireless anchor. The second time value associated with the second wireless anchor can be determined in a similar manner.

Returning to process 600, step 614 includes retrieving positions of the wireless anchors associated with the determined differences in step 612. In one embodiment, the positions of the wireless anchors are stored in a memory located at the pre-defined site. In another embodiment, the positions are obtained by the pre-defined site from an external database. In a further embodiment, each wireless anchor is aware of its own position and relays its position to the pre-defined site in the time-stamped packet.

Process 600 then proceeds to step 616, which includes performing a multi-lateration calculation using the determined differences and the retrieved positions to compute a position of the mobile device. In an embodiment, the position is then transmitted to the mobile device, and process 600 returns again to step 602.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A positioning system, comprising:
radio frequency (RF) circuitry configured to transmit and receive signals; and
processor circuitry, coupled to the RF circuitry, configured to:
receive a time-stamped packet from a first wireless anchor of a plurality of wireless anchors, the time-stamped packet including a first arrival time at the first wireless anchor of a packet transmitted by a mobile device, wherein the first arrival time of the packet is determined based on a clock at the first wireless anchor;
determine a first difference between the first arrival time of the packet and a second arrival time of the packet at a second wireless anchor of the plurality of wireless anchors, wherein the second arrival time of the packet is determined based on a clock at the second wireless anchor; and
compute a position of the mobile device, without time synchronizing the clock at the first wireless anchor with the clock at the second wireless anchor, based at least in part on the first difference and a common time reference that associates time values of the first wireless anchor and the second wireless anchor.

2. The positioning system of claim 1, wherein the processor circuitry is further configured to:
determine a second difference between the first arrival time of the packet and a third arrival time of the packet at a third wireless anchor of the plurality of wireless anchors; and determine a third difference between the first arrival time of the packet and a fourth arrival time of the packet at a fourth wireless anchor of the plurality of wireless anchors.

3. The positioning system of claim 2, wherein the processor circuitry is further configured to compute the position of the mobile device based at least in part on the first, second, and third differences.

4. The positioning system of claim 3, wherein the processor circuitry is further configured to:
determine first, second, third, and fourth positions of the first, second, third, and fourth wireless anchors respectively; and
perform a multi-lateration calculation using the first, second, third, and fourth positions and the first, second, and third differences to compute the position of the mobile device.

5. The positioning system of claim 1, wherein the processor circuitry is further configured to:
establish the common time reference; and
determine the first difference between the first arrival time of the packet and the second arrival time of the packet using the common time reference.

6. The positioning system of claim 1, wherein the processor circuitry is further configured to:
receive a second time-stamped packet from the first wireless anchor, the second time-stamped packet including a third arrival time at the first wireless anchor of a second packet transmitted from a known location; and
receive a third time-stamped packet from the second wireless anchor, the third time-stamped packet including a fourth arrival time at the second wireless anchor of the second packet.

7. The positioning system of claim 6, wherein the processor circuitry is further configured to:
determine, based on the third arrival time, a first time value associated with the first wireless anchor corresponding to a transmission time of the second packet;
determine, based on the fourth arrival time, a second time value associated with the second wireless anchor corresponding to the transmission time of the second packet; and
associate the first time value with the second time value to establish the common time reference.

8. The positioning system of claim 7, wherein the processor circuitry is further configured to:
calculate a propagation time of the second packet from the known location to the first wireless anchor; and
subtract the propagation time from the third arrival time of the second packet to determine the first time value associated with the first wireless anchor.

9. The positioning system of claim 6, wherein the second packet is transmitted from a third wireless anchor of the plurality of wireless anchors.

10. The positioning system of claim 5, wherein the processor circuitry is further configured to:
establish a second common time reference between the first wireless anchor and the second wireless anchor, the second common time reference being later in time with respect to the common time reference;
determine a difference between the common time reference and the second common time reference; and
calculate a polynomial approximation based on the difference between the common time reference and the second common time reference to determine a common time reference drift value.

11. A method, comprising:
receiving a time-stamped packet from a first wireless anchor of a plurality of wireless anchors, the time-stamped packet including a first arrival time at the first wireless anchor of a packet transmitted by a mobile device, wherein the first arrival time of the packet is determined based on a clock at the first wireless anchor;
determining a first difference between the first arrival time of the packet and a second arrival time of the packet at a second wireless anchor of the plurality of wireless anchors wherein the second arrival time of the packet is determined based on a clock at the second wireless anchor; and
computing a position of the mobile device, without time synchronizing the clock at the first wireless anchor with the clock at the second wireless anchor, based at least in part on the first difference and a common time reference that associates a time value of the first wireless anchor with a time value of the second wireless anchor.

12. The method of claim 11, further comprising:
determining a second difference between the first arrival time of the packet and a third arrival time of the packet at a third wireless anchor of the plurality of wireless anchors; and
determining a third difference between the first arrival time of the packet and a fourth arrival time of the packet at a fourth wireless anchor of the plurality of wireless anchors.

13. The method of claim 12, further comprising:
determining first, second, third, and fourth positions of the first, second, third, and fourth wireless anchors respectively; and
performing a multi-lateration calculation using the first, second, third, and fourth positions and the first, second, and third differences to compute the position of the mobile device.

14. The method of claim 11, further comprising:
establishing the common time reference; and
determining the first difference between the first arrival time of the packet and the second arrival time of the packet using the common time reference.

15. The method of claim 11, further comprising:
receiving a second time-stamped packet from the first wireless anchor, the second time-stamped packet including a third arrival time at the first wireless anchor of a second packet transmitted from a known location; and
receiving a third time-stamped packet from the second wireless anchor, the third time-stamped packet including a fourth arrival time at the second wireless anchor of the second packet.

16. The method of claim 15, further comprising:
determining, based on the third arrival time, a first time value associated with the first wireless anchor corresponding to a transmission time of the second packet;
determining, based on the fourth arrival time, a second time value associated with the second wireless anchor corresponding to the transmission time of the second packet; and
associating the first time value with the second time value to establish the common time reference.

17. The method of claim 16, further comprising:
calculating a propagation time of the second packet from the known location to the first wireless anchor; and subtracting the propagation time from the third arrival time of the second packet to determine the first time value associated with the first wireless anchor.

18. A positioning system, comprising:
a plurality of wireless anchors, wherein a first wireless anchor of the plurality of wireless anchors is configured to:
  receive a packet from a mobile device; and
  time-stamp the packet per a first arrival time of the packet, wherein the first arrival time of the packet is determined based on a clock at the first wireless anchor; and
processor circuitry configured to:
  receive the time-stamped packet;
  determine a first difference between the first arrival time of the packet and a second arrival time of the packet at a second wireless anchor of the plurality of wireless anchors, wherein the second arrival time of the packet is determined based on a clock at the second wireless anchor; and
  compute a position of the mobile device, without time synchronizing the clock at the first wireless anchor with the clock at the second wireless anchor, based at least in part on the first difference and a common time reference that associates time values of the first wireless anchor and the second wireless anchor.

19. The positioning system of claim 18, wherein the processor circuitry is located in the mobile device, a third wireless anchor of the plurality of wireless anchors, or a server.

20. The positioning system of claim 18, wherein the processor circuitry is further configured to:
  determine a second difference between the first arrival time of the packet and a third arrival time of the packet at a third wireless anchor of the plurality of wireless anchors;
  determine a third difference between the first arrival time of the packet and a fourth arrival time of the packet at a fourth wireless anchor of the plurality of wireless anchors;
  determine first, second, third, and fourth positions of the first, second, third, and fourth wireless anchors respectively; and
  perform a multi-lateration calculation using the first, second, third, and fourth positions and the first, second, and third differences to compute the position of the mobile device.

* * * * *

UNITED STATES PATENT AND TRADEMARK OFFICE
CERTIFICATE OF CORRECTION

PATENT NO. : 9,504,003 B2
APPLICATION NO. : 14/518245
DATED : November 22, 2016
INVENTOR(S) : George et al.

It is certified that error appears in the above-identified patent and that said Letters Patent is hereby corrected as shown below:

In the Claims

- In Column 14, Line 11, replace "anchors wherein" with --anchors, wherein--.

Signed and Sealed this
First Day of May, 2018

Andrei Iancu
*Director of the United States Patent and Trademark Office*